April 25, 1967 — F. B. RIKOFF — 3,315,823
ROTARY GRAIN DISTRIBUTOR
Filed Feb. 3, 1965 — 2 Sheets-Sheet 1
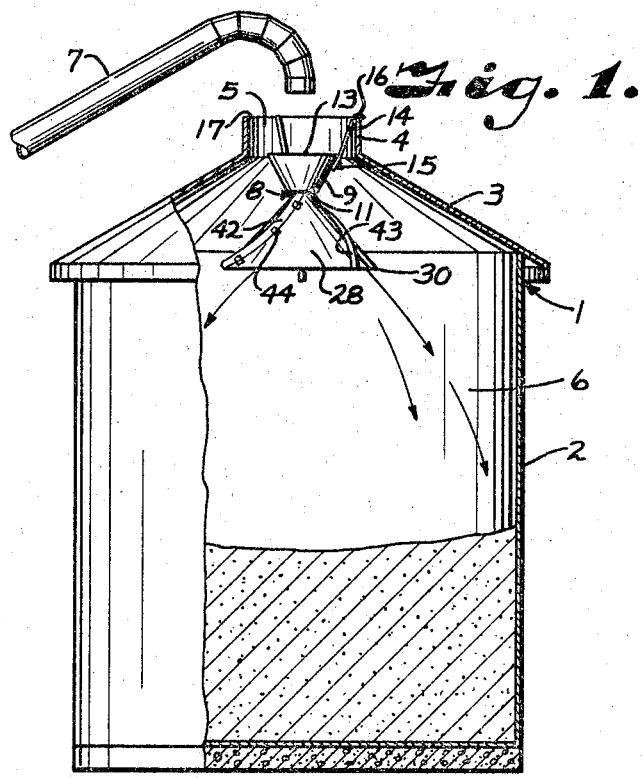
INVENTOR.
FRED B. RIKOFF
BY
Fishburn and Gold
ATTORNEYS INVENTOR.
FRED B. RIKOFF
BY
Fishburn and Gold
ATTORNEYS United States Patent Office 3,315,823
Patented Apr. 25, 1967

3,315,823
ROTARY GRAIN DISTRIBUTOR
Fred B. Rikoff, R.R. 1, Colby, Kans. 67701
Filed Feb. 3, 1965, Ser. No. 430,102
2 Claims. (Cl. 214—17)

This invention relates to material spreading or distributing devices, and more particulraly to a distributor for use in a grain bin, silo and like closed storage spaces, to effectively distribute therein material to be stored such as grain and the like substantially uniformly.

It is customary practice to move grain or other material to be stored in a closed storage space such as granaries, silos and the like by a conveyor or pipe and discharge such materail into a fill opening in the top wall of the storage device. This material drops through the opening and tends to pile on the bottom of the storage space in a compact dense deposit. Also, chaff, dirt and foreign material may tend to be segregated, all tending to cause hot spots in the grain. This necessitates workmen moving the grain or other material around during the time it is being poured into the top of the storage space in order to have proper distribution. Motor-driven rotors have been used below the inlet opening to effect some scattering or spreading of the material as it drops into the storage space; however, such structures are difficult to maintain safely in the heat and dust conditions usually present in such operations, and further they are expensive and can create hazards.

The principal objects of the present invention are to provide a rotary distributor for use in closed storage spaces such as grain bins and the like wherein the rotor has a conical surface with inclined vanes or fins thereon impacted by the gravitating material from the inlet opening to rotate the rotor and scatter the material; to provide a distributor structure with a funnel-shaped body mounted in the filling opening of the storage space with a bottom opening for delivery of material therethrough and a conical-shaped rotor axially thereof with means responsive to gravitation of the material from the funnel-shaped body rotating said rotor; to provide such a structure with a baffle in the funnel-shaped body with a periphery spaced from the wall of said body to define an annular passage therebetween for material moving downwardly to the discharge ends thereof, said baffle equalizing the flow around the interior of said body to the discharge thereof; to provide such a structure that is quickly and easily applied to or removed from the storage space and that requires no outside power for operation; and to provide a rotary grain distributor that is economical to manufacture, easily installed and maintained, that is strong and reliable in use to evenly and uniformly deposit material in a closed storage space area.

Other objects and advantages of this invention will become apparent from the following description taken in connection with the accompanying drawings wherein are set forth by way of illustration and example certain embodiments of this invention.

FIG. 1 is a side elevation of a distributor of the present invention mounted in a grain bin.

FIG. 2 is an enlarged vertical sectional view through the distributor.

FIG. 3 is an enlarged fragmentary perspective view of the rotor wall and fin mounted thereon.

Figure 4:
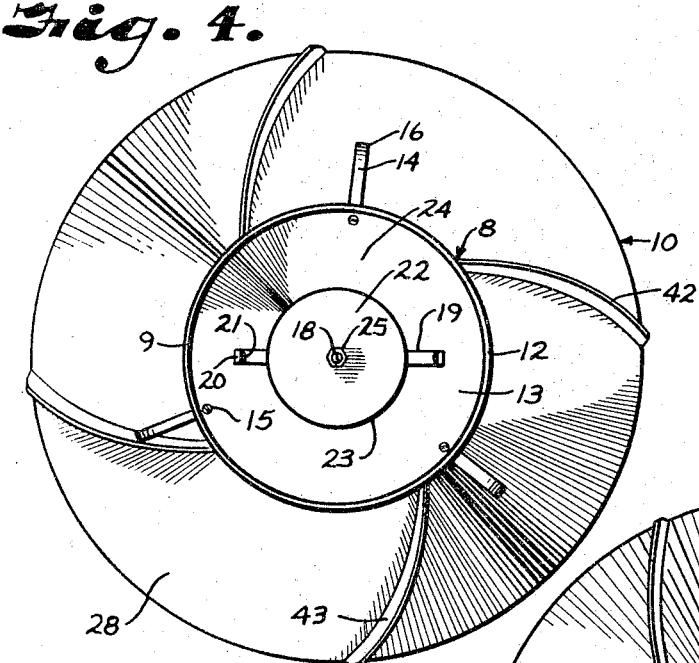
FIG. 4 is a top plan view of the distributor.

Referring more in detail to the drawings:

The reference numeral 1 generally designates a closed storage space illustrated as a grain bin having side walls 2, inclined top wall 3 and a ring-like portion 4 on said top wall and defining a filling opening 5 through which grain or other material to be stored is delivered to the interior 6 of the storage space. The material to be stored is delivered by suitable mechanism to said inlet opening as, for example, by the well known pipe or conveyor means 7.

The distributor mechanism generally designated by the reference numeral 8 includes a funnel-shaped body 9 that is mounted in the filling opening and a rotor 10 rotatably supported adjacent to and below a discharge opening 11 of the funnel-shaped body 9. In the structure illustrated, the funnel-shaped body 9 has a wall 12 converging downwardly and inwardly from a top opening or inlet 13 to the discharge opening 11 at the lower end. The structure is preferably frusto-conical and inverted wherein the inlet in the large upper end and discharge opening in the bottom smaller end are cylindrical. Hanger or mounting members 14 are suitably secured to the wall 12 and are adapted to be removably connected to the grain bin structure to support the funnel-shaped body substantially axially of the inlet opening 5 of the bin. In the structure illustrated, the hangers 14 are arms that are circumferentially spaced around the upper portion of the funnel-shaped body 9 with the lower ends of said arms suitably secured to the wall 12 as by bolts or the like 15. The arms extend upwardly and outwardly and terminate in hook-shaped upper ends 16 adapted to engage over the upper edge 17 of the ring-like member 4 to support the funnel-shaped body 9 in the fill opening with the upper end of said body 9 spaced below said upper edge 17. It is preferred that the top of the body 9 be adjacent the lower part of the ring portion 4.

A vertically disposed shaft 18 is supported from the funnel-shaped body 9 and extends downwardly substantially axially thereof to provide support for the rotor 10. In the structure illustrated, the funnel-shaped body is provided with a diametrically arranged bracket or bar 19 having end portions 20 suitably secured as by screws or the like 21 to the wall 12 in upwardly spaced relation to the discharge opening 11. It is preferred that a horizontal disc or baffle 22 be arranged axially of the funnel-shaped body with a peripheral edge 23 spaced from the wall 12 to provide an annular passage 24 therebetween so that material discharged into the funnel-shaped body will be directed outwardly against the wall 12 for evening the flow around the baffle and through the passage 24 and downwardly through the discharge opening 11. It is preferred that the baffle 22 be approximately midway the height of the body 9 and that it be secured relative to the bar 19 with the mounting of the shaft 18 as by nuts 25 and 26 threaded on a threaded upper end 27 of the shaft 18 and engaging the baffle 22 and the bar 19 respectively to hold the assembly together.

The rotor 10 is of a structure having a conical outer surface 28 that is inclined outwardly from an apex 29 to the lower outer periphery 30. In the structure illustrated, the rotor has a wall 31 defining the surface 28 and providing a hollow open bottom structure. At the apex 29, there is an opening 32 whereby the cone-shaped rotor is sleeved over the shaft 18. Inside of the hollow rotor, a generally spherical collar 33 is rotatably mounted on the shaft 18 by a suitable bearing, said collar engaging the inside of the wall 31 at the apex. A washer 34 preferably is located below the collar 33 and rests on a member 35 fixed to the shaft as, for example, a cotterpin which is preferably positioned whereby the apex of the rotor extends slightly into the lower end of the funnel-shaped body and provides an ample passage 36 between the bottom of the wall 12 and the surface 28 of the rotor for passage of material to be stored. To provide added support and stability to the rotor, there are transverse or diametrically arranged bars or brace members 37 having their outer ends secured to the wall 31 by suitable fastening devices 38, the bars preferably being perpendicular to each other. The center portions of the bars have aligned apertures 39 whereby they are sleeved over the shaft 18 with a collar 40 positioned therebelow and supported by suitable means fixed to the shaft such as a cotterpin or the like 41. This provides a rotor support whereby members rest on the washers or collars 34 and 40 held up by members 35 and 41 on the shaft with said rotor freely rotatable about the shaft 18.

Figure 5:
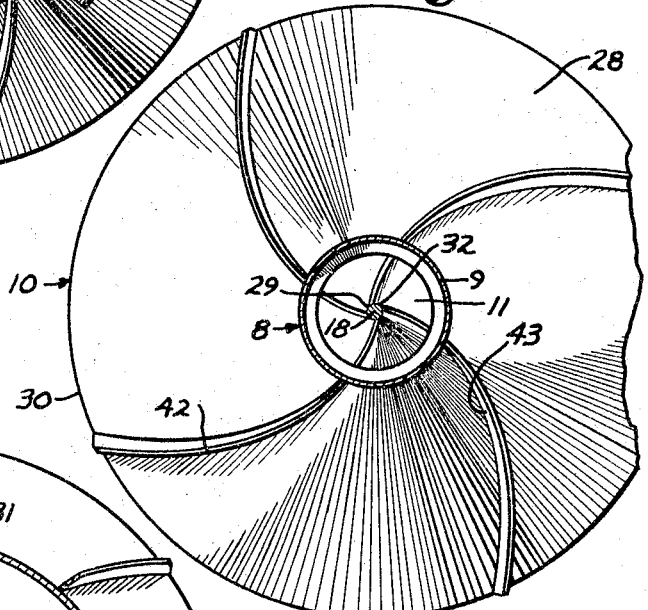
FIG. 5 is a transverse sectional view through the distributor taken on the line 5—5, FIG. 2.
Figure 6:
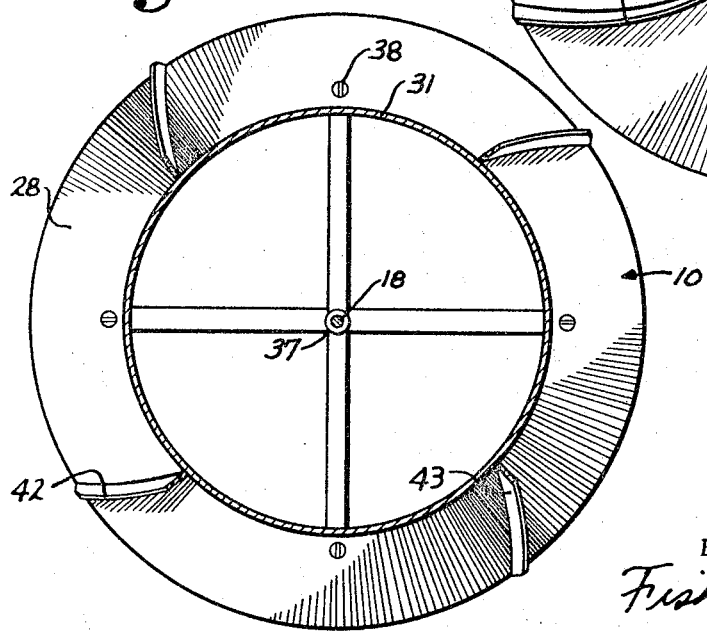
FIG. 6 is a transverse sectional view taken through the distributor on the line 6—6, FIG. 2.

The rotor 10 is provided with a plurality of outwardly projecting vanes or fins 42 circumferentially spaced around the surface 28 and inclined or spiraled thereon whereby each present a face 43 for impact by material moving down the surface 28 of the cone-shaped rotor. It is preferred that the fins or vanes 42 be curved in a spiral-like fashion and extend from substantially the apex 29 to the lower end 30 of the cone-shaped rotor 10, as illustrated in FIG. 5. The vanes or fins 42 are suitably secured to the wall 31 as by means of angle brackets 44 or other suitable fastening means to withstand the forces applied thereto and present unobstructed faces 43 of the vanes and adjacent surface of the rotor for movement of material downwardly thereon.

In using a structure constructed and assembled as shown and described, the structure with the rotor 10 supported on the shaft 18 that depends from the funnel-shaped body 9, and loose whereby said rotor is freely rotatable, is moved into the storage space 1. Then the structure is moved up so the hangers or arms 14 extend upwardly through the fill opening 5 and the upper ends 16 are hooked over the edge 17 to support the distributor. This completes the installation. When material such as grain is delivered to the fill opening 5 and discharged as from the pipe 7 into the inlet opening 13 of the funnel-shaped body 9, said material gravitates downwardly, strikes the baffle 22, and is directed outwardly substantially evenly into contact with the wall 12 whereby said material will fall through the annular passage 24 and the discharge opening 11 of the funnel-shaped body 9. The material gravitating or falling from the funnel-shaped body strikes the faces 43 of the fins or vanes 42 and, due to the inclined or spiraled arrangement thereof, effects a spinning or rotary motion of the rotor 10. Even while the rotor is rotating, the material or grain from the funnel-shaped body 9 strikes the fins and maintains the rotation. The material also moves down the surface of the rotor cone and through the rotation is discharged outwardly to effect a substantially uniform distribution thereof in the storage area, thereby eliminating any hot spots that could occur from grain being more dense or compact from being poured into the bin and dropping into a pile. The distribution is effective through the rotation of the rotor when the discharge is either fast or slow and will effect an even distribution of the foreign materials in the grain, such as cracked grain, chaff and the like.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A rotary material distributor comprising,
   (a) a funnel-shaped body having an upper open inlet end and an open lower discharge end,
   (b) means mounting said body in the filling opening of a storage space in substantially concentric relation thereto and with the lower end extending into said space,
   (c) a vertically disposed shaft,
   (d) means in said body supporting said shaft axially of said body lower end and extending downwardly therefrom,
   (e) a hollow open bottom cone-shaped rotor rotatably mounted on said shaft with the apex thereof adjacent the body lower discharge end of the funnel shaped body, a ball shaped collar within said rotor and rotatably mounted on said shaft, said collar supportedly engaging the apex of said rotor, a lower rotor support rotatably mounted on the shaft and spaced downwardly from the collar, transverse braces in the lower portion of the rotor and fixed to said lower support and the rotor, means on the shaft for each of the collar and lower rotor support to retain same against downward movement,
   (f) and a plurality of circumferentially spaced fins on said rotor and inclined downwardly thereon whereby material gravitating from the funnel-shaped body will strike said fins and effect rotation of the rotor and said material will be directed outwardly and downwardly from said rotor.

2. A rotary grain distributor comprising,
   (a) a funnel-shaped body having an upper open inlet end and a lower open discharge end,
   (b) arms secured to said body and extending upwardly and outwardly therefrom for engaging the filling opening defining portion of a grain bin to support said body in substantially concentric relation thereto with said lower discharge end extending into said bin,
   (c) a vertically disposed shaft,
   (d) a bar means secured to said body and extending transversely intermediate the ends thereof and mounting an upper end portion of said shaft to support same substantially axially of the body with said shaft extending downwardly therefrom,
   (e) a stationary horizontal baffle disc in said funnel-shaped body mounted on said shaft support with a periphery spaced from the body wall to form an annular passage therebetween of substantially uniform width,
   (f) a hollow open bottom cone-shaped rotor sleeved on said shaft and having a cone-shaped outer surface with the apex thereof adjacent the lower discharge end of the funnel-shaped body, a ball shaped collar within said rotor and rotatably mounted on said shaft, said collar supportingly engaging the apex of said rotor, a lower rotor support rotatably mounted on the shaft and spaced downwardly from the collar, transverse braces in the lower portion of the rotor and fixed to said lower support and the rotor, means on the shaft for each of the collar and lower rotor support to retain same against downward movement,
   (g) and a plurality of fins circumferentially spaced around said rotor and extending outwardly of said cone-shaped surface, said fins extending downwardly in a spiral substantially from the apex to the bottom of said cone-shaped surface whereby the grain gravitating from the funnel-shaped body will be directed outwardly and downwardly and strike the fins and impart rotation to said rotor.

References Cited by the Examiner

UNITED STATES PATENTS

| | | | |
|---|---|---|---|
| 1,590,866 | 6/1926 | Teske | 198—128 |
| 3,064,833 | 11/1962 | Von Ruden | 214—17 |

GERALD M. FORLENZA, *Primary Examiner.*

ROBERT G. SHERIDAN, *Examiner.*